Figure 1:
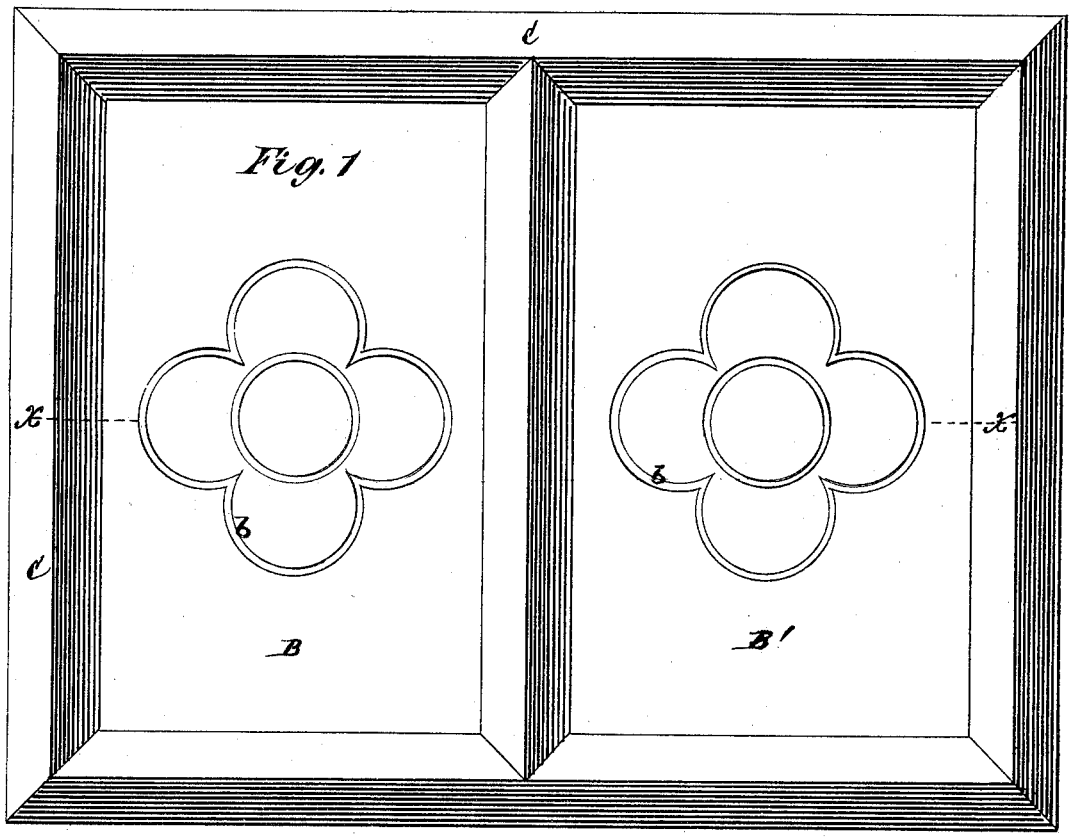

A. H. EMBLER.
COMBINED CEMENT AND GLASS PANELS.

No. 175,955. Patented April 11, 1876.

UNITED STATES PATENT OFFICE.

ADAM H. EMBLER, OF MONTGOMERY, NEW YORK.

IMPROVEMENT IN COMBINED CEMENT AND GLASS PANELS.

Specification forming part of Letters Patent No. 175,955, dated April 11, 1876; application filed November 18, 1875.

*To all whom it may concern:*

Be it known that I, ADAM H. EMBLER, of Montgomery, in the County of Orange, and State of New York, have invented a new and useful Combination of Cement and Glass, of which the following is a specification:

This invention relates to an improved facing or surfacing for buildings, monuments, furniture, and other similar uses, its objects being to provide a highly finished and polished surface to such structures and articles, that will better withstand the action of the elements, and various other decomposing agents, the facings or surfacings as heretofore constructed for such purposes.

My invention consists of a facing or surfacing for buildings, monuments, articles of furniture, and the like, composed of a layer of Portland or hydraulic cement spread upon a proper support and having a superposed layer of glass sections or slabs, as hereinafter more fully set forth.

The drawing represents my invention as applied to the construction of panels for building and other purposes, in which—

Figure 2:
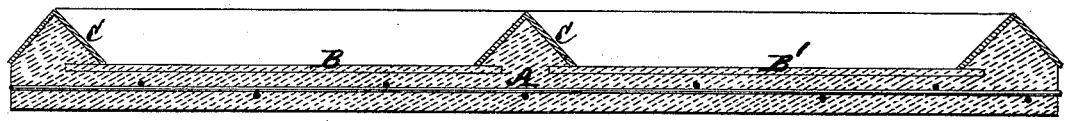

Figure 1 represents a front view of the panel, and Fig. 2 a transverse section taken on the line $x$ $x$ of Fig. 1.

The letter A represents the cement, spread upon a wire-gauze frame or other support, and B B' the glass facing, composed of frame plates or sheets, applied to the surface of the cement and embedded in the body of the same, so as to form one solid mass or body.

The glass sections may be provided at their joints with metallic coverings, C, if desired, to conceal said joints and give the panel a neat and finished appearance.

The glass sections may be ornamented with any suitable designs upon their backs, so as to show through and give an ornamental appearance to the surfacing, and the cement may be colored in any manner to give any desired tint to the finished article.

The improved facing as thus constructed possesses the advantage of a highly-finished and comparatively indestructible surface, and can be ornamented in various manners and colored between the adjoining surfaces of the two portions, so that said ornamental parts will be effectually excluded from atmospheric influences and from wear, and as the alkaline earths of the cement have an affinity for the silicic acid of the glass, the two parts become firmly united chemically at their surfaces, forming one solid and united piece.

What I claim, and desire to secure by Letters Patent, is—

The improved facing for buildings, furniture, and other like purposes, composed of a layer of hydraulic cement and a superposed layer of glass embedded in the surface and united to the same, substantially as described.

ADAM H. EMBLER.

Witnesses:
 HENRY T. BROWN.
 BENJAMIN W. HOFFMAN.